CARD HANDLING MECHANISM

Filed Dec. 29, 1954

INVENTORS
Robert D. Grapes &
Edward A. Damerau
BY Morris L. Rabkin
ATTORNEY

United States Patent Office 2,797,095

Patented June 25, 1957

2,797,095

CARD HANDLING MECHANISM

Robert D. Grapes, Woodbury, and Edward A. Damerau, Pine Hill, N. J., assignors to Radio Corporation of America, a corporation of Delaware Application December 29, 1954, Serial No. 478,464

6 Claims. (Cl. 271—63)

This invention relates to card handling mechanisms, and particularly to a mechanism for receiving and ejecting cards in a card reading system.

Card reading systems are employed for automatically sensing information encoded on perforated cards. The information may represent, for example, data pertinent to a sales transaction. The cards may be placed manually in the card reader, sensed, and ejected from the reader. Such a card reading system is described in a copending application for patent entilted "Card Reader Device," filed December 15, 1954, by John S. Baer and Robert A. Oberdorf, Serial No. 475,447. The card reading system described in the above application advances a card in successive steps, sensing at each step. It is desired to remove the cards from the card reader and to place them at a common collecting point automatically.

Accordingly, an object of the present invention is to provide an improved card handling mechanism which is more simple and economical than the mechanisms of the prior art.

Another object of this invention is to provide an improved card handling device for automatically removing cards from a card reading system, which device is characterized by reliability and freedom from mutilation of the cards.

A further object of this invention is to provide an improved card handling mechanism for simply, reliably, and economically receiving and ejecting cards from a card reading mechanism which senses a card in successive steps.

Another object of this invention is to provide an improved card handling mechanism for receiving cards from a card advancing system, which card handling mechanism permits, up to a desired limit of advance, withdrawal of the cards with the card advancing system.

A card handling mechanism provided in accordance with the invention employs a pair of opposed guide arms in the path of a card being sensed. The card passes between the guide arms, which press against the flat faces of the card. At the desired limit of movement the card advancing mechanism registers with a projection on one of the guide arms. The card advancing mechanism then pivots the guide arms, which free the card from the card advancing mechanism. As the card advancing mechanism returns to its start position, the guide arms return to the path of movement of the cards. The next succeeding card likewise passes between the guide arms, forcing out the previous card as it does so.

The novel features of the invention, as well as the invention itself, both as to its organization and method of operation, will best be understood from the following description, when read in connection with the accompanying drawing, in which like reference numerals refer to like parts, and in which.

Figures 1, 2, 3:
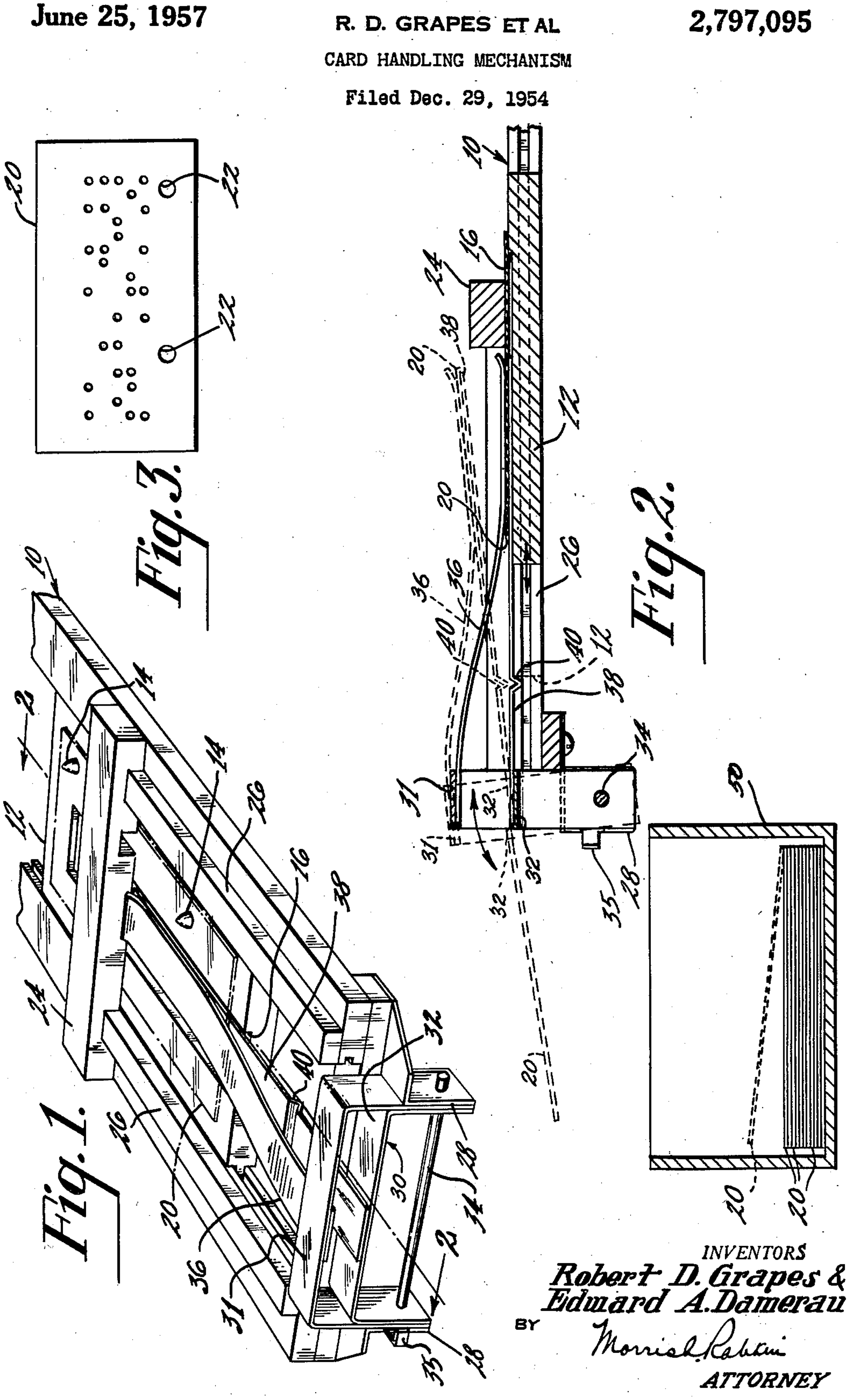
Fig. 1 is a perspective view of a card handling mechanism in accordance with the invention.
Fig. 2 is a schematic view of the mechanism in operation in a card reading system.
Fig. 3 is a plan view of a card which may be handled by the present mechanism.

Referring now to the figures, the mechanism may operate with a card sensing mechanism of the type described in the abovementioned Baer and Oberdorf application. A card-holding slide 12 moves within a grooved base structure 10. The slide 12 receives a card or tag 20 at a start position and moves in steps to a card eject position. For convenience, the parts of the mechanism on opposite sides of which the slide 10 moves will be referred to as the card entry side and the card exit side. Reference may be made, for example, to the Baer and Oberdorf application for a complete description of the arrangement and operation of the slide 12 advancing and return mechanism, and of the sensing mechanism. Accordingly, such description is not included herein.

The slide 12 includes a pair of positioning studs 14 mounted to register with large positioning perforations 22 on the planar card 20. A groove 16 extending in the direction of slide movement is provided in the surface of the slide 12. A card support bar 24 is mounted on the base structure 10 transverse to the direction of slide 12 movement. The card support bar 24 provides backing for the cards 20 at the position at which the cards 20 are sensed in the system described in the Baer and Oberdorf application. Side guide bars 26 mounted in the base structure 10 contain a card 20 against lateral movement, but do not restrict advancing movement.

A card ejecting or stripping assembly 30 is pivotally mounted on brackets 28 at the card exit side of the base structure 10. The card ejecting assembly 30 includes upper and lower support bars 31 and 32 transverse to the direction of slide 12 movement and shaped to define a card exit slot. The support bars 31, 32 include pivot arm portions coupled by a pivot pin 34 to the brackets 28 on the base structure 10. A stop member 35 is mounted on a bracket 28, in the line of the pivot arm portions of the support bars 31, 32 to limit pivoting motion of the card ejecting assembly 30. Upper and lower guide arms 36 and 38, respectively, are mounted on and normal to the upper and lower support bars 31 and 32, respectively. The lower guide arm 38 is substantially rigid and normally rides in the grooved portion 16 in the surface of the slide 12. The upper guide arm 36 is of a resilient material, so shaped as to tend to be in contact with the lower guide arm 38. When no card 20 is between the guide arms 36, 38 they are in contact over a predetermined length from their free ends. The free end of the upper guide arm 36 is curved away from the lower guide arm 38 to provide an entry guide portion for a card. A small integral projection or offset portion 40 is provided in the lower guide arm 38 at a predetermined point with relation to the slide 12. The card exit side edge of the slide 12 may register with the inclined offset portion 40 of the lower guide arm 38 as the slide 12 is advanced. A card hopper 50 may be located adjacent the card exit end of the mechanism.

In operation, a card 20 may be placed manually on the slide 12 with the slide 12 in its start position at the card entry side of the mechanism. The positioning perforations 22 on the card 20 fit about the positioning studs 14 on the slide 12. When in the card receiving position, the free end of the lower guide arm 38 rides in the groove 16 in the surface of the slide 12. The mechanism is actuated on signal from an operator and repeated advancing steps of the slide 12 begin, as described in the above-mentioned Baer and Oberdorf application.

The card 20 may start from any desired position with respect to the card support bar 24. Assume, however, that the leading (in an advance movement) edge of a card 20 is placed partially under the card support bar 24 by an operator. As the slide 12 advances in steps toward the card exit side of the mechanism the leading edge of the card 20 passes from under the card support bar 24 and fits between the entry guide portion defined by the free ends of the two guide arms 36, 38. The lower guide arm 38 is in the aperture defined by the groove 16 in the slide 12 and the card 20. With the next subsequent advancing steps the card 20 spreads the guide arms 36, 38 slightly and passes between them. The resilient upper guide arm 36 presses the card 20 against the lower guide arm 38, gripping or restraining the card 20 but permitting the card 20 to be advanced. The card 20 remains in the same plane of movement during this action. The card 20 is pushed along by the positioning studs 14 until the trailing edge of the card is past the card support bar 24. At this card position the entire card 20 is between the guide arms 36, 38. The entire card 20 has, at this position, passed the sensing position.

The card 20 is now free to be removed automatically from the slide 12 so that the slide 12 may be returned to its start position. Accordingly, as the slide 12 is advanced further to some desired limit position, the leading edge of the slide 12 registers with the offset portion 40 of the lower guide arm 38. The edge of the slide 12 causes the entire ejector assembly 30 to pivot counterclockwise (as viewed in Fig. 2) about the pivot pin 34. The guide arms 36, 38 hold the card 20 firmly, so that the card 20 is stripped from the slide 12 and positioning studs 14. The stop member 35 prevents the ejector assembly 30 from pivoting more than a limited amount.

As long as the slide 12 is in a fully advanced position the ejector assembly 30 is held by the offset portion 40 in an inclined position. When the slide 12 is snapped back to the start position to receive a new card 20, however, the guide arms 36, 38 pivot back to the plane of movement of the advancing cards 20. The card 20 held between the guide arms 36, 38 is restrained from lateral movement by the side guide bars 26. The trailing edge of the card 20 is closely confined between the free ends of the upper and lower guide arms 36 and 38.

A new card 20, entered, held, and advanced in the manner previously described, now passes under the tag support bar 24 and between the upper and lower guide arms 36 and 38. The leading edge of the new card 20, however, registers with the trailing edge of the first card 20 between the upper and lower guide arms 36 and 38. As the following card 20 is advanced, therefore, the first card 20 is pushed out from between the guide arms 36, 38 through the card exit slot defined by the support bars 31, 32. The first card 20 thus falls into the card hopper 50 as the following, second, card 20 is held between the guide arms 36, 38. The slide 12 may be returned to its start position and another reading and advancing operation carried out with yet another new card.

Note that the cards are positively driven without the use of special grippers or rollers. Further, if the leading edge of a card should not properly register with the previous card a useful safety feature is provided. The leading positioning stud 14 on the slide 12 contacts the trailing edge of the card 20 between the guide arms 36, 38. The card is therefore pushed to a position at which it is no longer restrained by the guide arms 36, 38. Then, when the ejector assembly 30 is pivoted, the card slides through the card exit slot into the card hoper 50. Another feature is that a card may be withdrawn to the start position at any point in the slide 12 movement until the card is free of the card support bar 24. In some applications or operations it may be desired to sense only part of a card and then to return the card to the start position for manual removal. By the mechanism provided the card is free to be withdrawn at any step of its stepped advance. The withdrawal is acocmplished positively but there is no danger of confusion of the withdrawal motion with the ejection of the card.

Thus there has been provided a reliable and efficient mechanism for handling cards. The mechanism is characterized by extreme simplicity of design and economy of operation. By employing the card advancing device as the source of power the mechanism minimizes the need for complicated coordinated card handling equipment.

What is claimed is:

1. A card handling mechanism for removing planar cards moved on an advancing member and restricted from movement in the plane of said cards with respect to said member, said mechanism comprising a first elongated member pivotally mounted about an axis transverse to the direction of travel of said card, said first member extending along the path of advance and adjacent the plane of said card and having a projection thereon, said projection registering with said advancing member at a predetermined point thereby to pivot said first elongated member as said advancing member further advances, and a second elongated member mounted in fixed opposed relation to said first member and with said first member providing a length of restricted movement therebetween for a card on said advancing member.

2. A card handling mechanism comprising a slide for holding a planar card, said slide being movable in the plane of said card and including projections for restraining a card thereon from movement in said plane, a pair of coupled, pivotally mounted and opposed guide arms in the path of movement of said card and so positioned that a card enters between said guide arms on movement, at least one of said guide arms being of resilient material and mounted to slidably grip a card between said guide arms throughout a predetermined length of the movement of said card, and a projection mounted on one of said guide arms in the path of said slide and cooperating with said slide at a predetermined position to pivot said guide arms.

3. A card handling mechanism for removing planar cards positioned and advanced by positioning projections on a card-holding slide, said slide being advanced in the plane of said card to a predetermined limit position from a start position, said mechanism comprising a rigid guide arm pivotally mounted adjacent said limit position about an axis transverse to the direction of travel of said card, said guide arm resting adjacent the plane of said card and having an offset portion registering with the advancing slide at a predetermined point, thereby to pivot said rigid guide member, and a resilient guide arm pivotally mounted with said rigid guide arm and defining therewith a card exit slot at said limit position, said resilient guide arm providing with said rigid guide arm a predetermined length of restricted movement for a card advanced with said slide.

4. A card handling mechanism for removing and ejecting cards advanced on a card holding slide, said card being held in position on said slide by positioning projections, said slide being advanced in the plane of said card to a predetermined limit position from a start position, said mechanism comprising guide members mounted along the path of advance of said cards to contain said cards against lateral movement with respect to the advance movement, a rigid guide arm pivotally mounted adjacent said limit position about an axis transverse to the direction of travel of said card, said rigid guide arm in a card receiving position resting adjacent the plane of said card and having a free end extending opposite to the advancing movement of said card, said rigid guide arm including an offset inclined portion registering with the advancing slide at a predetermined point, thereby to pivot said rigid guide member, a resilient guide arm pivotally mounted with and fixed to said rigid guide arm and defining therewith a card exit slot adjacent said limit position, said resilient guide arm providing with said rigid guide arm a widened entry portion for receiving a card and a predetermined length of slidably gripping contact for a card advanced with said slide, and a limit member fixedly mounted with respect to said guide arms for limiting the pivoting movement of said guide arms.

5. A card handling mechanism comprising means for moving a planar card in the plane of said card, said means for moving including members for positioning said card and a surface defining with said card an aperture extending in the direction of movement of said card, and pivotally mounted gripping means defining a guide path along said aperture in the plane of movement of said card, said pivotally mounted means including a pair of opposed guide members responsive to the position of said moving means.

6. A card-holding mechanism comprising means for moving a planar card forward and backward along an axis in the plane of said card, said means for moving including a groove extending in the direction of said axis and defining with said card an aperture along said axis, projecting members mounted on said means for moving for positioning said card in said plane, a pair of pivotally mounted guide members defining a guide path in the plane of a card, said guide members extending in the backward direction of movement of a card along said groove from a pivot point, said guide members providing a length of slidably gripping contact for cards moved forwardly and backwardly along said axis, said guide members also providing registry between the edges of succeeding cards moving forwardly along said axis, and a projecting member mounted on one of said pair of guide members to register with said means for moving to pivot said guide members at a predetermined position of forward movement of said means for moving, thereby to remove a card between said guide members from said projecting members.

References Cited in the file of this patent

UNITED STATES PATENTS

| | | |
|---|---|---|
| 378,245 | Valentine | Feb. 21, 1888 |
| 1,002,078 | Paoli | Aug. 29, 1911 |
| 2,583,442 | Parlini | Jan. 22, 1952 |